United States Patent Office 2,916,813
Patented Dec. 15, 1959

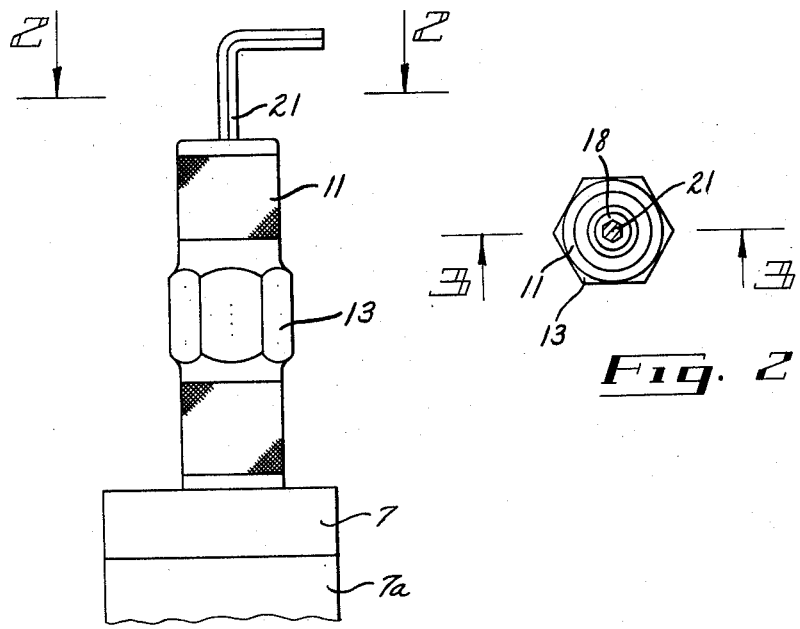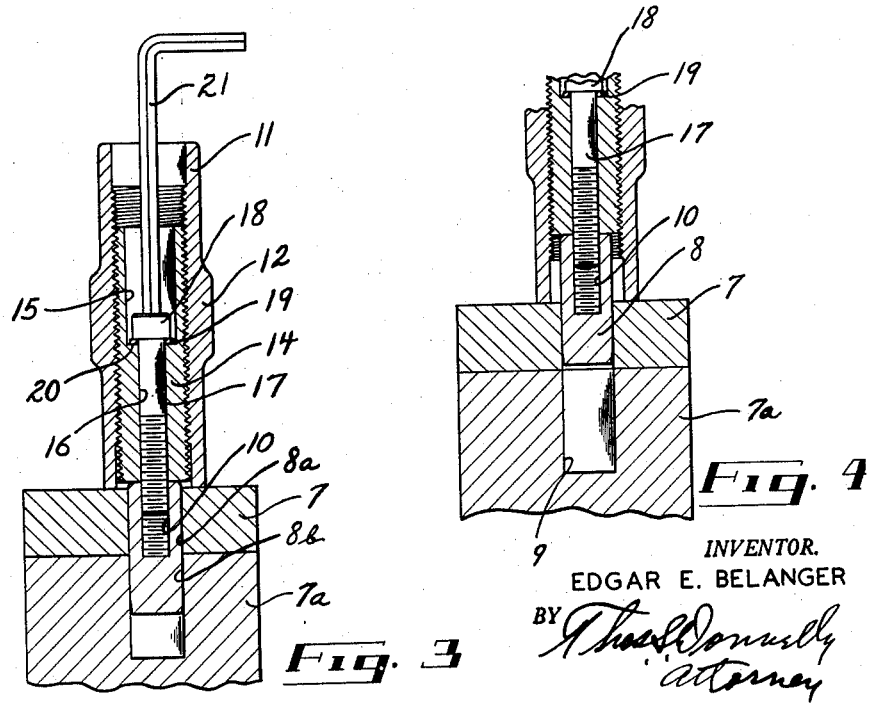

2,916,813

BLIND DOWEL EXTRACTOR

Edgar E. Belanger, Detroit, Mich.

Application November 18, 1955, Serial No. 547,751

2 Claims. (Cl. 29—256)

My invention relates to a new and useful improvement in a blind dowel extractor.

It is an object of the present invention to provide an extractor of this class whereby a blind dowel may be easily and quickly extracted from the body in which positioned.

In the die industry, it is customary to fasten the die sections to the die shoe by means of screws or bolts which are projected through the die section and threaded into the die shoe. It is also customary to drill a passage through the die section and into the die shoe so that this passage has a blind passage or socket formed in the die shoe. There is then driven through this passage formed in the die section and into the socket formed in the die shoe a dowel and the dowel has a press-fit with the die section and with the die shoe.

If the die shoe is thin enough, the passage would be drilled through the die shoe, and in that event, you would not have a blind dowel mounting.

The present invention, however, relates to the structure in which the die shoe is of such a thickness that the dowel receiving passage is not drilled clear through the die shoe.

Difficulty has been encountered in removing these dowels from the blind dowel mounting in that the passage is not extended completely through the die shoe, and it is in such structures that the present invention is intended for use.

Another object of the invention is the provision of an extractor of this class having a wear plate whereby excessive wear on the tool is eliminated.

Other objects will appear hereinafter.

It is recognized that various modifications and changes may be made in the details of the structure illustrated without departing from the invention, and it is intended that the present disclosure shall be considered to be but the preferred embodiment.

Forming a part of this application are drawings, in which:

Fig. 1 is a side elevational view of the invention;

Fig. 2 is a view taken on line 2—2 of Fig. 1;

Fig. 3 is a longitudinal central sectional view of the invention showing the dowel in position to be removed;

Fig. 4 is a fragmentary sectional view similar to Fig. 3, showing the dowel partially removed.

In the drawings, I have illustrated a die section 7, through which is formed a passage 8a for the reception of the dowel 8. This passage 8a is in alignment with the socket 8b which is formed in one face of the die shoe 7a. This dowel is inserted through the passage 8a and in the socket 8b and has a press-fit.

The extractor comprises a tube 11 having internal threads and provided, intermediate its ends, with a head 12 having flat faces 13 to provide a nut. Threaded into the tube 11 is an extracting tube 14 which is provided with a socket 15 communicating with the passage 16. Extending through this passage 16 is a bolt 17 having a head 18 which bears, at one of its faces, with the wear plate or washer 19 made of a hard wearing resisting material. This wear plate rests upon the shoulder 20 of the member 14. The bolt 17 is of the socket head type in which one end of the wrench 21 may be inserted.

In use the parts are assembled, as shown in Fig. 3, with the screw or bolt threaded into the threaded socket 10 of the dowel 8. The end of the tube 11 is in engagement with the face of the die section 7. When this screw 17 has been threaded into the dowel, the member 14 is thus fixedly connected to the dowel. Upon rotating of the tube 11 by means of a stud wrench, pressure is built up between the face of the die section 7 and the end of the tube 11. The rotation is in a direction to tend to move the member 14 upwardly of the member 11, and as this upward movement continues, the dowel 8 is extracted or withdrawn from the passage 9 as clearly shown in Fig. 4.

Experience has shown that a structure of this type is one which is quite durable in use and also highly efficient, effecting a rapid extracting of the dowel from the block into which it has been pressed.

What I claim is:

1. A blind dowel extractor of the class described, comprising: an elongated tubular body having a threaded bore; a threaded extracting tube threaded into said tubular body and movable longitudinally thereof upon relative rotation of said tubular body and extracting tube; said extracting tube having a socket formed in one end communicating with a passage extending from the bottom of the socket through the opposite end of the tube; said passage being of a smaller diameter than said socket to provide the said extracting tube with a shoulder; a dowel engaging bolt extending through said passage and having a head engaged with said shoulder when the bolt is engaged with a dowel to lock the dowel and extracting tube together, whereby said tube will not rotate with said body; and, means on said tubular body for rotating said body relative to said extracting tube for moving said tube longitudinally of said body.

2. A blind dowel extractor of the class described, comprising: an elongated tubular body having a threaded bore; a threaded extracting tube threaded into said tubular body and movable longitudinally thereof upon relative rotation of said tubular body and extracting tube; said extracting tube having a socket formed in one end communicating with a passage extending from the bottom of the socket through the opposite end of the tube; said passage being of a smaller diameter than said socket to provide the said extracting tube with a shoulder; a dowel engaging bolt extending through said passage and having a head engaged with said shoulder when the bolt is engaged with a dowel to lock the dowel and extracting tube together, whereby said tube will not rotate with said body; means on said tubular body for rotating said body relative to said extracting tube for moving said tube longitudinally of said body; and, a hardened wear plate positioned between said shoulder and one face of said bolt head with said head engaging said wear plate.

References Cited in the file of this patent

UNITED STATES PATENTS

| | | |
|---|---|---|
| 1,395,587 | McLochlan | Nov. 1, 1921 |
| 1,873,250 | Adolph | Aug. 23, 1932 |
| 2,487,331 | Greene | Nov. 8, 1949 |
| 2,488,036 | Pofcher | Nov. 15, 1949 |